US012668111B2

(12) United States Patent　　　　(10) Patent No.:　US 12,668,111 B2

Lockwood　　　　　　　　　　　　　　(45) Date of Patent:　　Jun. 30, 2026

(54) THERMAL SHADE FOR VEHICLE WITH PANORAMIC ROOF

(71) Applicant: Lyman G. Lockwood, Glendale, CA (US)

(72) Inventor: Lyman G. Lockwood, Glendale, CA (US)

( * ) Notice: Subject to any disclaimer, the term of this patent is extended or adjusted under 35 U.S.C. 154(b) by 137 days.

(21) Appl. No.: 18/617,166

(22) Filed: Mar. 26, 2024

(65) Prior Publication Data

US 2025/0303838 A1　　Oct. 2, 2025

(51) Int. Cl.
　　　*B60J 11/04*　　　　(2006.01)

(52) U.S. Cl.
　　　CPC ........... *B60J 11/04* (2013.01); *B32B 2250/40* (2013.01); *B32B 2307/304* (2013.01); *B32B 2605/00* (2013.01)

(58) Field of Classification Search
　　　CPC ... B60J 11/00; B60J 11/04; B60J 11/06; B60J 11/08
　　　See application file for complete search history.

(56) References Cited

U.S. PATENT DOCUMENTS

| | | | | | |
|---|---|---|---|---|---|
| 4,399,347 | A | * | 8/1983 | Schmitt ..................... | B60J 11/08 |
| | | | | | 52/171.2 |
| 4,867,216 | A | * | 9/1989 | McKee ..................... | B60J 11/00 |
| | | | | | 150/166 |
| 5,435,362 | A | * | 7/1995 | Chiang ..................... | B60J 11/00 |
| | | | | | 296/136.01 |

| | | | | | |
|---|---|---|---|---|---|
| 5,497,819 | A | * | 3/1996 | Chiang ..................... | B60J 11/00 |
| | | | | | 296/136.01 |
| 5,547,734 | A | * | 8/1996 | Tusch ..................... | B32B 5/024 |
| | | | | | 428/920 |
| 5,664,825 | A | * | 9/1997 | Henke ..................... | B60J 11/00 |
| | | | | | 160/231.2 |
| 6,696,674 | B1 | * | 2/2004 | Doornsbosch ........... | H05B 3/36 |
| | | | | | 219/528 |
| 7,673,924 | B1 | * | 3/2010 | Lau ........................... | B60J 11/08 |
| | | | | | 296/95.1 |
| 7,699,380 | B2 | * | 4/2010 | Coleman .................. | B60J 11/06 |
| | | | | | 296/136.01 |
| 9,126,475 | B2 | * | 9/2015 | Niyogi ..................... | H05B 3/34 |
| 9,156,339 | B1 | * | 10/2015 | Perez ....................... | B60J 11/04 |
| 9,302,572 | B2 | * | 4/2016 | Wang ........................ | B60J 11/04 |
| 10,421,344 | B2 | * | 9/2019 | Ghannam .............. | B60J 1/2094 |
| 10,710,441 | B2 | * | 7/2020 | Tester ...................... | E04H 15/06 |
| 10,800,240 | B2 | * | 10/2020 | Cassell ................... | B32B 5/245 |
| 11,020,620 | B2 | * | 6/2021 | Walker ..................... | A62C 3/07 |
| 11,358,443 | B2 | * | 6/2022 | Tosetto .................... | B60J 11/08 |

(Continued)

FOREIGN PATENT DOCUMENTS

| | | |
|---|---|---|
| CN | 202186269 | 4/2012 |
| CN | 202847399 | 4/2013 |
| CN | 104015598 B | 3/2016 |

*Primary Examiner* — Johnnie A. Shablack

(74) *Attorney, Agent, or Firm* — John D. Carpenter

(57)　　　　　ABSTRACT

A thermal shade for an automobile having a panoramic roof includes an elongated jacket sized to overlay a vehicle's panoramic roof and a thermally insulating layer sandwiched within the jacket. Magnetic tape strips or individual magnets are located along the perimeter of the jacket and provide means for securing the thermal shade to the automobile. The thermal shade has a streamlined appearance and does not obscure the automobile's doors or door windows and does not interfere with the vehicle's security camera.

9 Claims, 3 Drawing Sheets

(56)            References Cited

U.S. PATENT DOCUMENTS

| | | | |
|---|---|---|---|
| 11,667,179 B2 * | 6/2023 | Ulcickas | B60J 5/0486 |
| | | | 296/24.35 |
| 2005/0179281 A1 * | 8/2005 | Brown | B60J 11/08 |
| | | | 296/95.1 |
| 2005/0242610 A1 * | 11/2005 | Galindo | B60J 11/08 |
| | | | 296/95.1 |
| 2009/0066112 A1 | 3/2009 | Sharapov | |
| 2012/0285588 A1 * | 11/2012 | Sheppard | B60J 11/04 |
| | | | 150/166 |
| 2013/0279037 A1 * | 10/2013 | Wong | G02B 7/182 |
| | | | 359/871 |
| 2016/0050718 A1 * | 2/2016 | Follman | H05B 3/34 |
| | | | 219/202 |
| 2016/0167498 A1 * | 6/2016 | Castillo | B60J 11/04 |
| | | | 150/166 |
| 2017/0111960 A1 * | 4/2017 | Arafa | H05B 3/36 |
| 2017/0326959 A1 * | 11/2017 | Taylor | B60J 11/04 |
| 2018/0043762 A1 * | 2/2018 | Blanco | B60J 11/06 |
| 2018/0111466 A1 * | 4/2018 | Ching | B60J 11/04 |
| 2019/0092154 A1 * | 3/2019 | Gorlo | B60J 11/04 |
| 2019/0193544 A1 * | 6/2019 | Gallego | B60J 11/04 |
| 2019/0210440 A1 * | 7/2019 | Esqueu Vinoles | B60J 11/04 |
| 2019/0255927 A1 * | 8/2019 | Georges | B60J 11/04 |
| 2021/0370752 A1 * | 12/2021 | Johnson | B32B 3/18 |
| 2023/0095924 A1 | 3/2023 | Reid | |
| 2025/0206117 A1 * | 6/2025 | Abraham | B60J 11/08 |
| 2025/0313071 A1 * | 10/2025 | Rico-Madrazo | B60J 11/04 |
| 2025/0319757 A1 * | 10/2025 | Siltanen | B60J 11/04 |

* cited by examiner

THERMAL SHADE FOR VEHICLE WITH PANORAMIC ROOF

FIELD OF THE INVENTION

The invention relates to thermal shades for automotive vehicles having panoramic roofs.

BACKGROUND OF THE INVENTION

Panoramic roofs are increasingly popular in automotive design. A glass roof that encompasses the front windshield, rear window, and space above the cabin interior offers greater visibility, more head room, and improved structural integrity. Late-model electric vehicles, such as the Tesla Model 3 and Model X, the Porsche Taycan, numerous Mercedes-Benz models, etc. are highly aesthetic and popular with consumers. Panoramic roofs are also found in non-electric vehicle models, such as the Bentley Flying Spur.

Notwithstanding their appeal, panoramic roofs can present a thermal management problem for automotive designers. A glass roof traps heat, like a greenhouse. When a car having a panoramic roof is parked outside in direct sunlight, the car interior heats up quickly, which can cause discomfort for human and four-legged occupants and lead to undesirable heating of automotive electronics. In automobiles having an energy management system, radiant heat gain above a preset level can trigger cabin ventilation and/or air conditioning systems to activate, which draws current from the automobile's battery supply in order to address the rising cabin temperature. This reduces the battery charge and can even shorten the life of the battery.

Existing efforts to counteract solar heat gain are inadequate. Shades placed inside the interior of the cabin, even directly up against the windshield, the overhead portion of the panoramic roof, or the rear window, fall short because the incident solar energy has already reached the glass and caused it to heat up, which in turn triggers the thermal management system and leads to the aforementioned problems. Canopy-style car covers are known, but they drape over the automobile and thereby impede access to the vehicle's doors and windows. In addition, canopies are unattractive and do not blend in with the sleek, streamlined appearance of new electronic vehicles. They can be awkward to put on, take off, and store. They also interfere with the vehicle's security camera and "smart" sensors located near the rearview mirror. What is needed is a streamlined thermal shade that functions well with electric vehicles and other automobiles having panoramic roofs.

SUMMARY OF THE INVENTION

The present invention provides a thermal shade for an automobile having a panoramic roof. The shade includes an elongated jacket sized to overlay a vehicle's panoramic roof—including the front windshield and rear window—and a thermally insulating layer sandwiched within the jacket. Magnetic tape strips or a plurality of individual magnets are located along or near the perimeter of the jacket and provide a means for securing the thermal shade to the roof edge members of the automobile. The thermal shade has a streamlined appearance and does not obscure the automobile's doors or door windows and does not interfere with the vehicle's security camera.

BRIEF DESCRIPTION OF THE DRAWINGS

Various features and advantages of the invention will be understood more completely when considered in conjunction with the accompanying drawings, which are not necessarily drawn to scale, wherein.

DETAILED DESCRIPTION OF THE INVENTION

Figure 1:
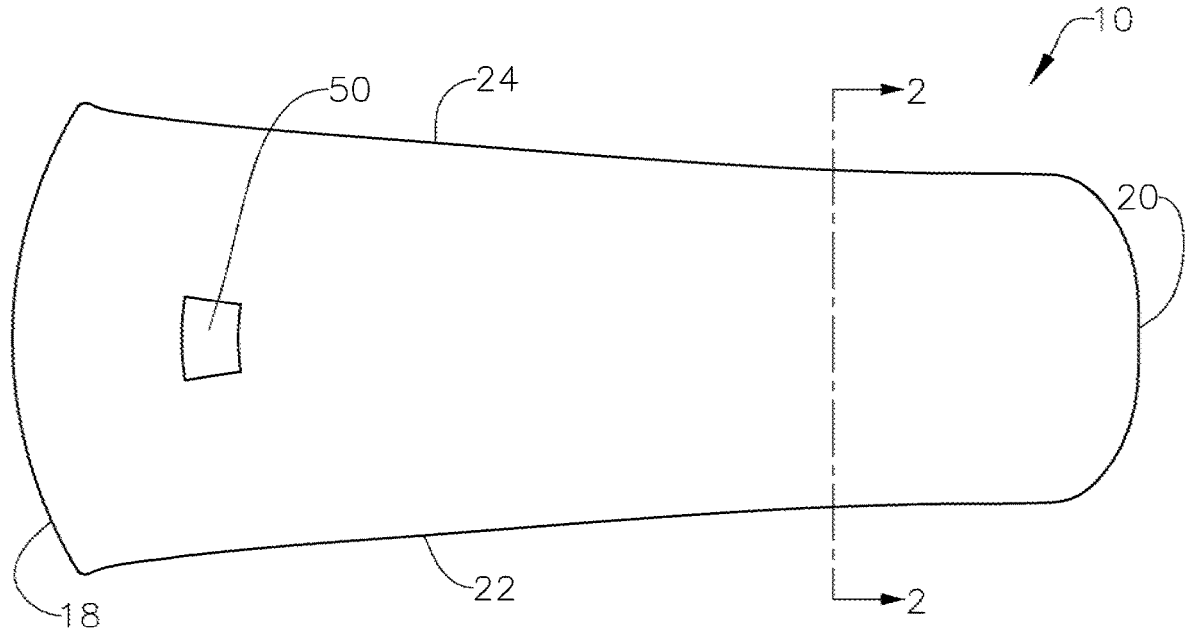
FIG. 1 is a schematic top view of a thermal shade according to one embodiment of the invention.
Figure 2:
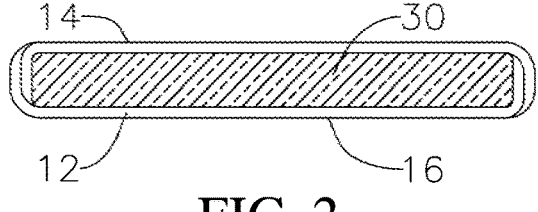
FIG. 2 is a sectional view of the embodiment shown in FIG. 1 taken along the line 2-2.
Figure 3:
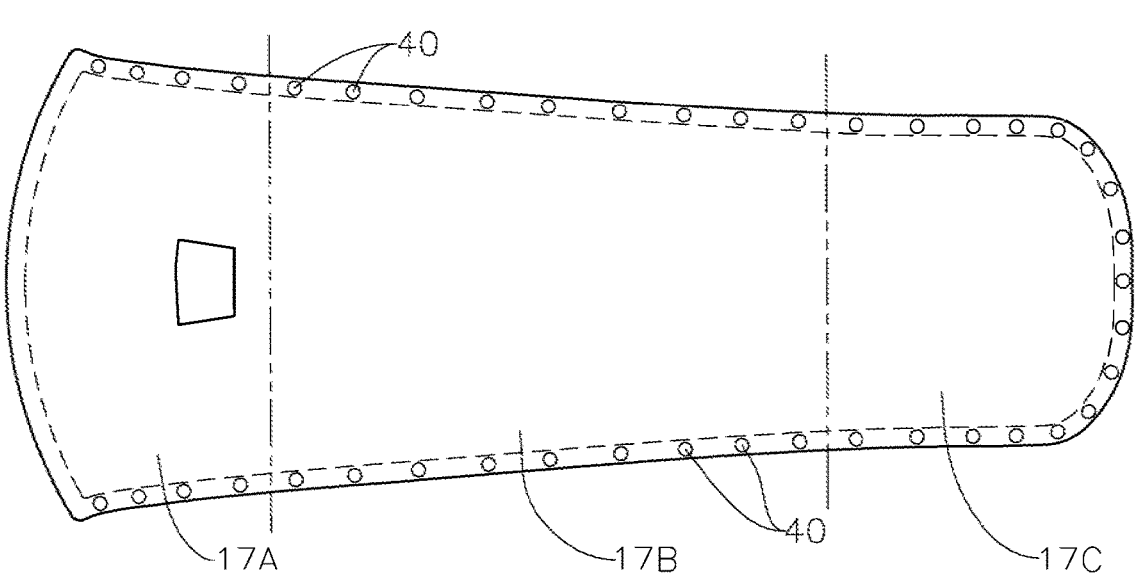
FIG. 3 is a second schematic top view of the embodiment shown in FIG. 1, showing the location of individual magnets near the perimeter of the shade.

Referring initially to FIGS. 1-3 there is shown a thermal shade constructed in accordance with one embodiment of the present invention. Shade 10 includes an elongated jacket 12 having a top face 14, bottom face 16, front section 17A, middle section 17B, rear section 17C, front end 18, rear end 20, left side 22, and right side 24. A thermally insulating layer 30 is sandwiched between the top and bottom faces of the jacket and extends longitudinally from substantially the front end of the jacket to substantially the rear end of the jacket, and transversely from substantially the left side of the jacket to substantially the right side of the jacket. One or more magnetic tape strips or a plurality of individual magnets 40 are seated within or coupled to the jacket along or near each of two or more regions of the perimeter of the jacket and provide means for releasably securing the thermal shade to an automobile having a panoramic roof and steel roof edge members. These "regions" of the jacket perimeter correspond to the left side, right side, front end, and rear end of the jacket. In the embodiment shown in FIG. 3, individual magnets 40 are located near the jacket perimeter along the left side 22, right side 24, and rear end 20, but not the front end, because in many automobiles, there is a gap between the leading edge of the front wind shield and the trailing edge of the hood.

Figure 4:
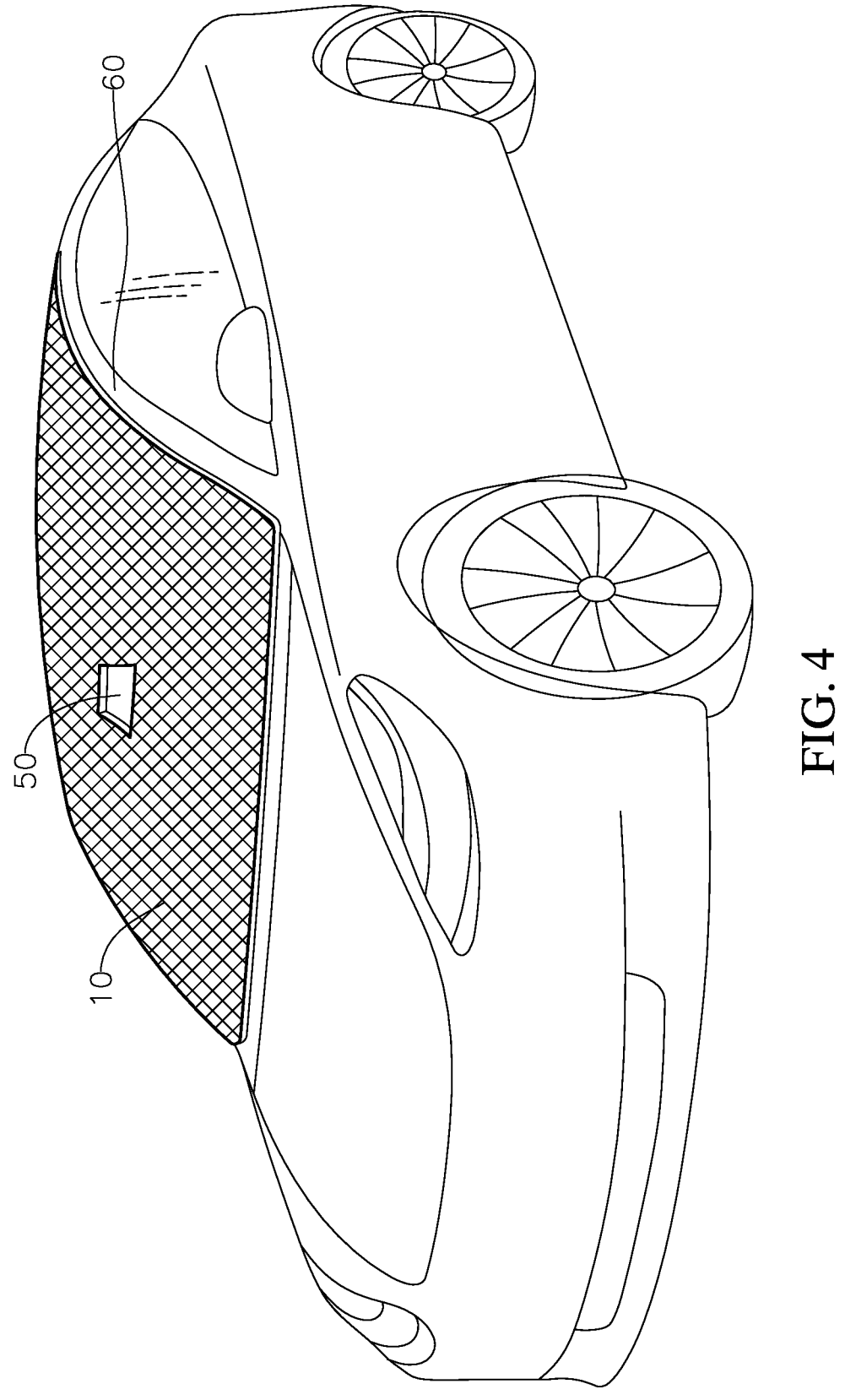
FIG. 4 is a schematic perspective view of an automobile having a panoramic roof, equipped with a thermal shade according to the embodiment shown in FIGS. 1-3.
Figure 5:
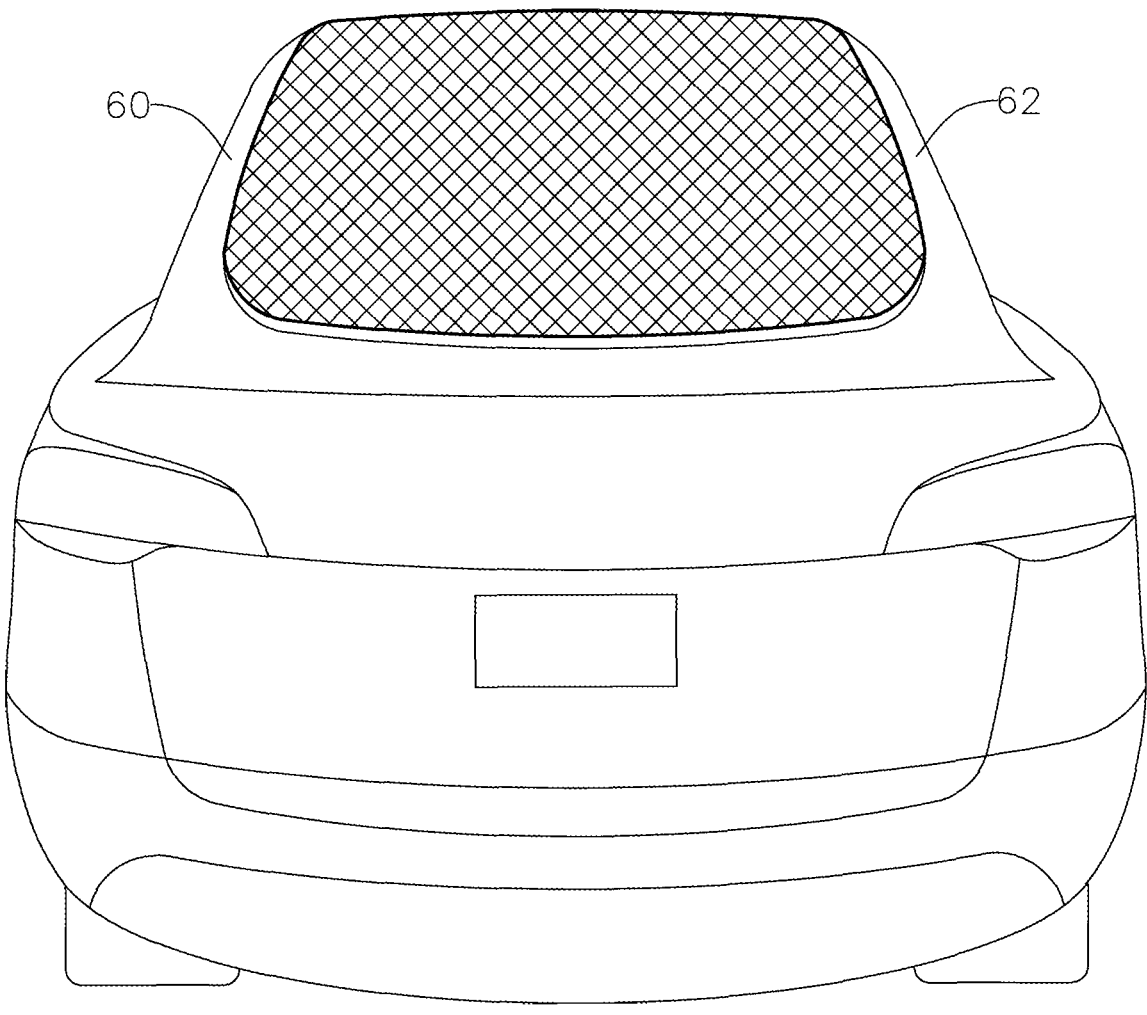
FIG. 5 is a schematic rear view of an automobile having a panoramic roof, equipped with a thermal shade according to the embodiment shown in FIGS. 1-3.

As shown in FIGS. 4 and 5, the thermal shade 10 has dimensions such that, when placed atop an automobile having a panoramic roof, the shade covers the glass surfaces of the roof (including the front windshield and rear window), but not the doors or door windows. In the embodiment shown in the drawings, the jacket's front section 17A is wider than the middle 17B and rear 17C sections of the jacket, and thus accommodates the common situation where the automobile's front windshield, being laterally curved, is wider than the middle top of the panoramic roof. Unlike a bulky car canopy, the shade does not extend on to the sides of the automobile and does not cover the door windows.

In some late-model automobiles, a security camera and/or other sensor is mounted within or next to the rear-view mirror or its housing. In the thermal shade shown in the drawings, a small opening 50 in the front section 17A or middle section 17B of the shade extends through the jacket and the thermally insulating layer to accommodate such a camera or sensor, which is thus operable even when the shade is placed atop the automobile. The opening extends through the top face 14 of the jacket, the insulating layer 30, and the jacket's bottom face 16. In one embodiment, the edges of the opening are sealed such that the insulating layer is not exposed.

The jacket is made of one or more layers of durable, flexible material. In a preferred embodiment, the jacket material is resistant to UV light and water. Nonlimiting examples include various polymer fabrics, such as UV-resistant ripstop nylon, Dyneema® fabric, and similar materials. The jacket may be dark (e.g., black or dark gray) in color to match more closely a dark tint in the panoramic roof of the automobile. Alternatively, the shade may have a lighter color. The jacket can be made of a single sheet of fabric or two or more sheets of fabric. In one example, the top face 14 and bottom face 16 of the jacket are each made of one or more layers of fabric and the top and bottom faces are attached to each other along or near their perimeter. The faces can be attached to each other along or near their perimeters by any suitable means, such as sewn seams (including, e.g., French seams), adhesives, ultrasonic welding, etc.

The thermally insulating layer 30 is sandwiched between the top face 14 and bottom face 16 of the jacket and reduces radiant heat gain caused by incident solar radiation. In one embodiment, the insulating layer is a layer of metalized cloth fabric or metalized bubble wrap. It acts as a radiant barrier that reduces the transfer of heat into the interior of the vehicle.

The thermally insulating layer can be permanently attached to either or both faces of the jacket or releasably inserted between them. In the latter case, access means are provided to permit the insulating layer to be inserted, removed as needed (e.g., to allow the insulating layer and the interior of the jacket to be cleaned), and then reinserted. The access means can be as simple as leaving all or a portion of one end of the jacket unsealed, or by attaching one or more fasteners, such as snaps, buttons, a zipper, hook and loop strips (e.g., VELCRO® fasteners), etc., along the front or rear end of the jacket where the top and bottom faces meet. Once the insulating material has been inserted, the access means can be closed by engaging the fastener(s).

A plurality of magnets 40 or magnetic tape are located at various regions along or near the perimeter of the shade. In FIG. 3, several magnets 40 are located along the entire perimeter of the shade, except for the front end of the shade where the shade will meet the space between the windshield and the hood of the automobile. In other embodiments, fewer magnets are employed, but a sufficient number are provided, e.g., along the left and right sides, the rear end, and/or the front end, to ensure that the shade will stay attached to the automobile's steel roof edge members, trunk, and/or front hood. In one embodiment, instead of individual magnets, strips of magnetic tape are used to secure the shade to the automobile. Single-sided and double-sided magnetic tape strips are commercially available in a number of different lengths, widths, and magnetic strengths from various companies and vendors, such as 3M Co., Amazon, etc.

When individual magnets are employed, they can be held in seams or pouches formed in or coupled to either or both faces of the jacket along or near the perimeter of the jacket. Alternatively, the magnets can be secured to the jacket with adhesive tape or glue. Similarly, strips of magnetic tape can be adhered to either or both faces of the jacket along or near the perimeter of the shade. In one embodiment, one or more seams are sewn in either or both faces of the jacket to position the magnetic tape.

To secure the thermal shade 10 to an automobile when the automobile is parked, one simply unrolls or unfolds the shade and places it atop the vehicle, positioning it so that the front section 17A of the jacket extends over the front windshield, the middle section 17B of the jacket covers the panoramic roof directly overhead the cabin interior, and the rear section 17C of the jacket covers the vehicle's rear window. The left side 22 and right side 24 of the jacket extend onto at least a portion of the vehicle's left and right roof edge members such that the magnets/magnetic strips are positioned to couple, magnetically, with the roof edge members and thereby hold the shade in place. This is shown in FIGS. 4 and 5. The edge of the left side 22 of the jacket extends laterally onto the vehicle's left roof edge member 60 from the leading edge of the front windshield to the bottom of the vehicle's rear window but does not extend laterally beyond the left roof edge member on to the driver side door or windows. The right side of the shade is similar; the edge of the right side 24 of the jacket contacts the vehicle's right roof edge member 62 but does not extend laterally beyond the right roof edge member on to the passenger side door or windows. The shade does not obscure the driver or passenger side doors or windows of the automobile. The magnets (or magnetic tape) secured within the perimeter of the jacket couple, magnetically, with the vehicle's steel roof edge members to hold the shade atop the vehicle.

The invention has been described in terms of various embodiments and features, and with reference to FIGS. 1-5. Other embodiments, features and modifications may be apparent to the skilled person upon reading this description. The invention is limited only by the appended claims and equivalents thereof.

What is claimed is:

1. A thermal shade for an automobile having left side and right side doors with windows, left and right roof edge members, and a front windshield coupled to a rear window via a panoramic roof, comprising:

an elongated jacket, having a top face, bottom face, front section, middle section, rear section, front end, rear end, left side, and right side, wherein the front section is configured to cover the front windshield, the middle section is configured to cover the panoramic roof, and the rear section is configured to cover the rear window, and wherein the front section is flared and wider than the middle section, and the middle section is wider than the rear section;

a thermally insulating layer sandwiched between the top and bottom faces of the jacket and extending longitudinally from substantially the front end of the jacket to substantially the rear end of the jacket, and transversely from substantially the left side of the jacket to substantially the right side of the jacket; and one or more magnetic tape strips or a plurality of individual magnets for releasably securing the thermal shade to the automobile, seated in or coupled to the jacket along or near each of two or more regions of the perimeter of the jacket.

2. The thermal shade recited in claim 1, wherein the jacket is configured to cover the front windshield, rear window, and panoramic roof of the automobile without extending on to the automobile door windows.

3. The thermal shade recited in claim 1, further comprising a small opening extending through the jacket and the insulating layer configured to allow a security camera in the automobile to operate even when the shade is placed atop the automobile.

4. The thermal shade recited in claim 1, wherein the magnetic tape strip(s) or individual magnets are located along at least the left and right sides of the jacket.

5. The thermal shade recited in claim 4, further comprising one or more magnetic tape strip(s) or a plurality of individual magnets located along or near the rear end of the jacket.

6. The thermal shade recited in claim 1, further comprising access means for removing and reinserting the thermally insulating layer into the jacket.

7. The thermal shade recited in claim 1, wherein the thermally insulating layer comprises metalized cloth fabric or metalized bubble wrap.

8. A thermal shade for an automobile having left side and right side doors with windows, left and right roof edge members, and a front windshield coupled to a rear window via a panoramic roof, comprising:

an elongated jacket, having a top face, bottom face, front end, rear end, left side, and right side, wherein the front section is configured to cover the front windshield, the middle section is configured to cover the panoramic roof, and the rear section is configured to cover the rear window, and wherein the jacket has a width that progressively increases from the rear end of the jacket to the front end of the jacket;

a thermally insulating layer sandwiched between the top and bottom faces of the jacket and extending longitudinally from substantially the front end of the jacket to substantially the rear end of the jacket, and transversely from substantially the left side of the jacket to substantially the right side of the jacket;

a small opening extending through the jacket and the insulating layer configured to allow a security camera in the automobile to operate even when the shade is placed atop the automobile; and one or more magnetic tape strips or a plurality of individual magnets for releasably securing the thermal shade to the automobile, seated in or coupled to the jacket along or near each of two or more regions of the perimeter of the jacket.

9. A thermal shade for an automobile having left side and right side doors with windows, left and right roof edge members, and a front windshield coupled to a rear window via a panoramic roof, comprising:

an elongated jacket, having a top face, bottom face, front section, middle section, rear section, front end, rear end, left side, and right side, wherein the front section is configured to cover the front windshield, the middle section is configured to cover the panoramic roof, and the rear section is configured to cover the rear window of the automobile;

a thermally insulating layer sandwiched between the top and bottom faces of the jacket and extending longitudinally from substantially the front end of the jacket to substantially the rear end of the jacket, and transversely from substantially the left side of the jacket to substantially the right side of the jacket;

access means for removing and reinserting the thermally insulating layer into the jacket; and one or more magnetic tape strips or a plurality of individual magnets for releasably securing the thermal shade to the automobile, seated in or coupled to the jacket along or near each of two or more regions of the perimeter of the jacket.

\* \* \* \* \*